UNITED STATES PATENT OFFICE 2,636,976

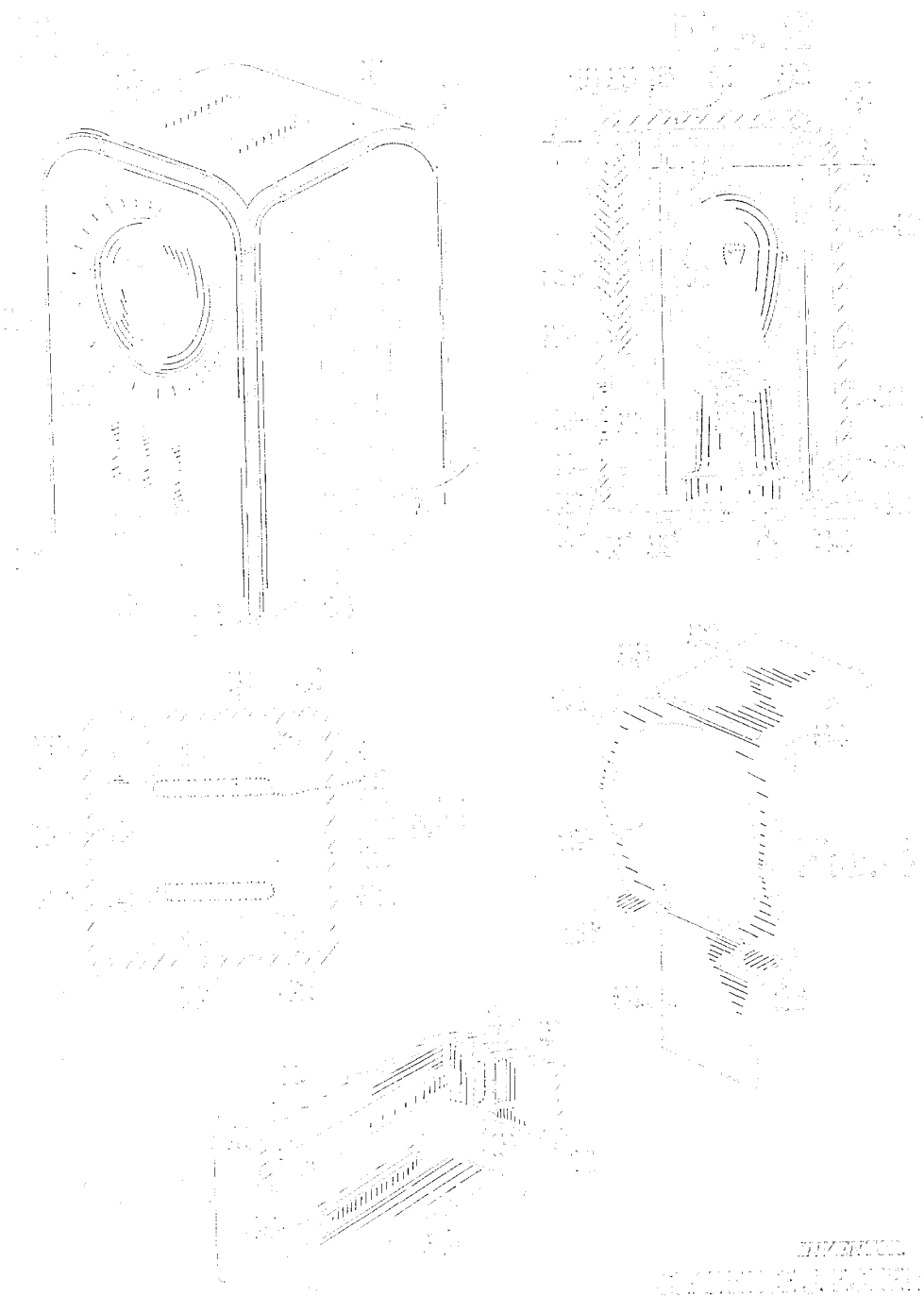

SUBSTAGE ILLUMINATOR FOR MICROSCOPES

Clarence J. Eckert, Rochester, N. Y., assignor to Bausch & Lomb Optical Company, Rochester, N. Y., a corporation of New York Application March 1, 1950, Serial No. 146,999

3 Claims. (Cl. 240—41)

This invention relates to improvements in illuminating devices of the type which is particularly adaptable for use with microscopes or the like.

It is an object of this invention to provide a novel illuminating device of the above-mentioned type which is simple and strong and has its parts grouped in advantageous sub-assemblies which are automatically aligned with each other upon assembly and may be quickly disassembled without the use of tools.

Another object is to provide such a device having unified interior light shielding means by which the lamp is made light-tight.

Further objects and advantages will be apparent in certain novel details of construction and in the combination and arrangement of parts as described in the following description and shown in the accompanying drawing in which:

Fig. 1 is a general perspective view of an illuminating device incorporating my invention, Fig. 2 is a longitudinal mid-sectional view of said device, Fig. 3 is a cross sectional view taken on the line 3—3 of Fig. 2 and looking in the direction of the arrows, Fig. 4 is a perspective view of the light shielding means and lens retainer, and Fig. 5 is a fragmentary, perspective view of certain details of construction of said device in separated relation.

A preferred form of my invention is shown in Fig. 1 of the drawing as comprising an integral lamp housing 10 having front and back walls 11 and 12 respectively, side walls 13 and 14 and a top wall 15. The housing 10 is open at the bottom and rests on two cross rails 16 and 16' protruding downwardly from the opposite side walls 13 and 14. In the front wall 11 there is formed a large opening 17 through which light from an electric lamp 18 is projected. The heat generated by the lamp 18 is vented to the outside of the housing 10 by air currents entering the inlet ports 19 in the lower part of the front wall 11 and leaving through the outlet ports 21 in the top wall 15. In the design of housing 10, its component parts have been so shaped and arranged as to be easily produced by commercial molding processes using a plastic material, preferably of the thermosetting type such as the phenolic resins.

Across the opening 17 any desired light transmitting member, such as a lens 22 and/or a filter glass 23, is held by a resilient lens retainer 24 preferably formed from sheet metal. Projecting lips 25 and 26 are formed on the retainer 24 to position the filter glass 23 over the opening 17.

An aperture 27 located substantially in the mid-section of the retainer 24 is provided to permit the passage of light therethrough. Suitable spring metal is used for constructing the retainer 24 and it is provided with a somewhat bowed shape so that the retainer may resiliently bear at one side against the lens 22 or filter glass 23. The other side of the retainer 24 bears at its side edges against a pair of vertical ribs 28 and 29 projecting from the interior surface of side walls 13 and 14 respectively, substantially parallel with the front wall 11 as best shown in Fig. 3.

A feature of this invention is the light shield structure by which light is prevented from escaping from the housing 10. For simplifying the internal structure of the lamp housing, the light shields are combined with the retainer 24, this construction having the further advantage that the shields are well secured in their proper location as described hereinafter. The air inlet ports 19 are shaded from light emanating from lamp 18 by a lower shield 31 projecting downwardly from the main body of retainer 24 in spaced relation to the interior surface of front wall 11 over said inlet ports. Similarly, the outlet ports 21 are shaded by an upper shield 32 extending laterally from the upper part of retainer 24 in spaced relation to the top wall 15 over the ports 21 so that said retainer and the light shields 31 and 32 constitute together a unitary member. Upper shield 32 is made narrower than the main body of retainer 24 in order to provide a pair of upper locating shoulders 33 and 34 which lie adjacent to a horizontal pair of interior housing ribs 35 and 36 on top wall 15 to assist in locating the retainer in the housing. The width of shield 32 is such that space between the opposed ribs 28 and 29 in the housing and shield 32 is provided sufficiently to allow easy assembly of the retainer. As seen in Fig. 2, the lower shield 31 abuts the bottom of the lamp housing whereby the retainer 24 is held securely in position so that the opening 17 and aperture 27 are in substantial alignment with each other.

Another feature of this invention is the means for demountably supporting the lamp assembly in housing 10. This sub-assembly includes the lamp 18 which is held in a socket 37 secured by suitable means such as screws 38 to a bottom plate 39. Said plate is preferably made of sheet steel material and it substantially fills the opening at the bottom of housing 10. A pair of vertical stiffener ribs 41 and 42 extend along the interior side walls 13 and 14 respectively of the housing similarly to ribs 28 and 29 and all these vertical ribs terminate in coplanar abutment surfaces at their lower ends, two of which are shown at 43 and 44. Bottom plate 39 lies against said abutment surfaces, thereby positioning the lamp 18 correctly both vertically and laterally with respect to the lens 22. In order to retain the bottom plate 39 against the abutment surfaces, upstanding spring hooks or detents 45 and 46 are formed on the plate 39 at opposite sides as best shown in Figs. 2 and 5. Preferably the hooks 45 and 46 are integrally formed on the bottom plate 39 and when so constructed, this member should be made of spring metal. These hooks frictionally engage with a corresponding pair of ledges 47 and 48 protruding from the inner surface of the front and back walls 11 and 12 at such a distance above the bottom of the housing 10 that the hooks engage over said ledges to secure the plate 39 snugly against the abutment surfaces 43 and 44.

When assembling this device, the lens 22 and filter 23 are placed over the opening 17 in housing 10 as shown in Fig. 2 and the lens retainer 24 is inserted between the filter and the pair of ribs 25 and 26 and it is shoved upwardly against the upper housing ribs 35 and 36. Then the lamp assembly including the bottom plate 39, is inserted in the bottom of the housing and the hooks 45 and 46 are forced over the ledges 47 and 48 to retain the assembly in aligned position against the horizontal surfaces 43 and 44.

From the foregoing description, it will be seen that this illuminating device comprises a minimum of loose parts and may, accordingly, be assembled very easily. The light shields 31 and 32 and the other constructional details, furthermore, are designed to secure satisfactory lighttightness of the housing as well as to assure correct alignment of the lamp and the lens, all of which is in accordance with the objects of this invention.

Although but certain forms of this invention have been shown and described in detail, it will be understood that other forms are possible and changes may be made in the arrangement of the parts and substitutions may be made therein without departing from the spirit of the invention as claimed in the appended claims.

I claim:

1. In an illuminating device of the type described comprising a housing, a front wall in said housing having therein an opening for the passage of light and having air inlet ports beneath said opening, a top wall in said housing having air outlet ports therein, a lens in said opening, a lamp aligned with said lens, interior ribs spaced away from the front wall on opposite side walls of the housing, a resilient sheet metal retainer located in the space between said ribs and front wall, said retainer pressing against the lens and abutting at its side edges against said ribs to hold the lens in said opening, said retainer having a hole therein aligned with the first said opening for the passage of light, a light shield extending from the lower part of said retainer over and spaced from said inlet ports, and another light shield extending from the upper part of said retainer over and spaced from the outlet ports, the upper light shield being narrower than the main body of the retainer so as to provide a shoulder at each side edge by which to seat the retainer on said ribs, whereby a unified light shielding and lens retaining structure is provided.

2. An illuminating device of the type described comprising a housing having a front wall with an opening therein for the passage of light, a lens in said opening, a plurality of ribs protruding interiorly from opposite side walls of the housing and terminating at their lower ends in substantially coplanar downwardly facing abutment surfaces, at least two of said ribs being opposite to each other and parallel with the front wall, a retainer plate for holding said lens in said opening, said plate being seated at its side edges against the two said ribs and bearing against the lens, a lamp aligned with said lens, a lamp mounting including a bottom plate on which said lamp is mounted and held in alignment with the lens by contact of the plate with said abutment surfaces, a pair of inwardly projecting ledges oppositely located near the bottom of the housing on two interior surfaces thereof, and a pair of spring hooks on said bottom plate engaging over said ledges to hold the bottom plate against said abutment surfaces, whereby the lamp is properly aligned with the lens and held in that position by a demountable connection.

CLARENCE J. ECKERT.

References Cited in the file of this patent

UNITED STATES PATENTS

| Number | Name | Date |
|---|---|---|
| 1,966,531 | Tint | July 17, 1934 |
| 2,033,619 | Foster et al. | Mar. 10, 1936 |
| 2,272,040 | Muldoon | Feb. 3, 1942 |
| 2,412,313 | Battersby et al. | Dec. 10, 1946 |
| 2,525,977 | Timmerman | Oct. 17, 1950 |